No. 756,953. PATENTED APR. 12, 1904.
A. GAULIN.
SYSTEM FOR INTIMATELY MIXING MILK.
APPLICATION FILED SEPT. 30, 1902.
NO MODEL. 2 SHEETS—SHEET 1.
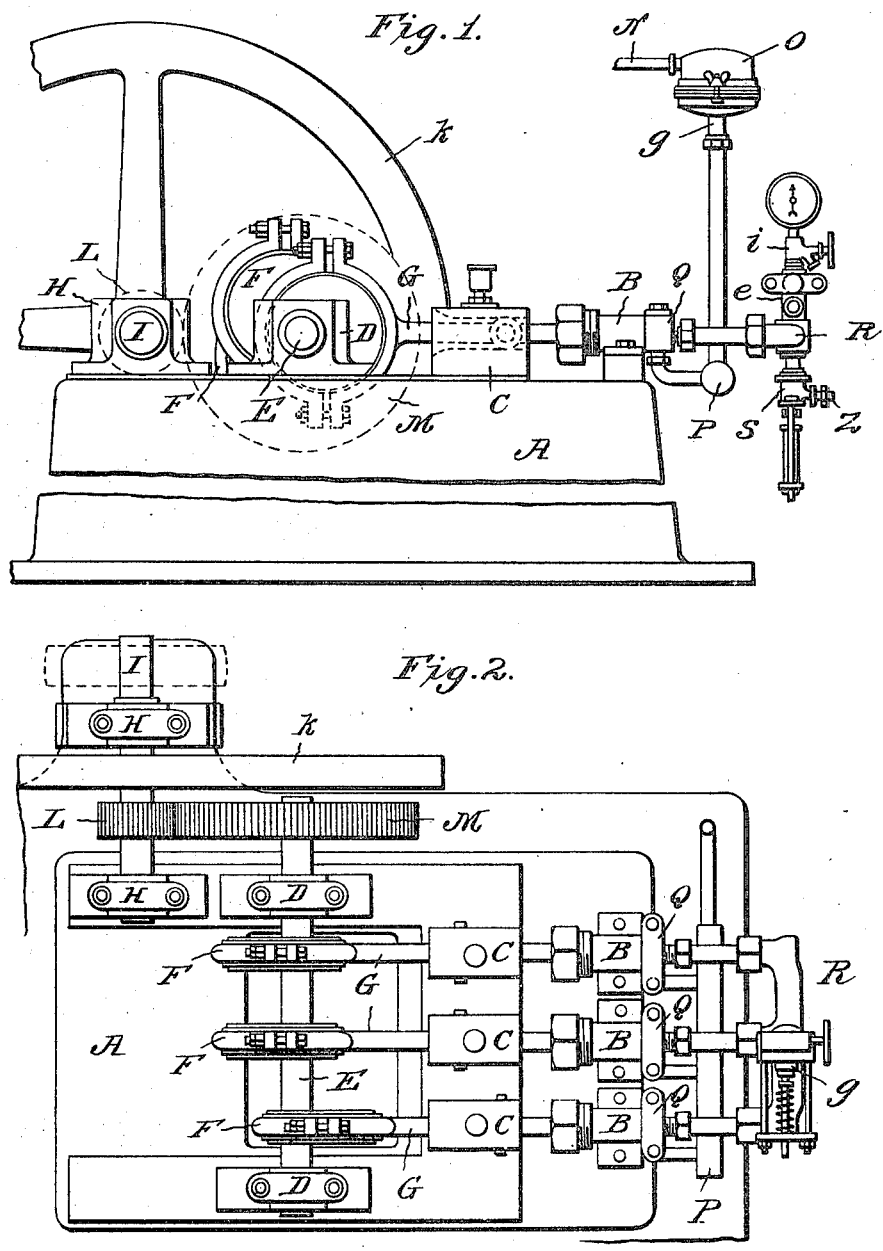

No. 756,953. PATENTED APR. 12, 1904.
A. GAULIN.
SYSTEM FOR INTIMATELY MIXING MILK.
APPLICATION FILED SEPT. 30, 1902.
NO MODEL. 2 SHEETS—SHEET 2.
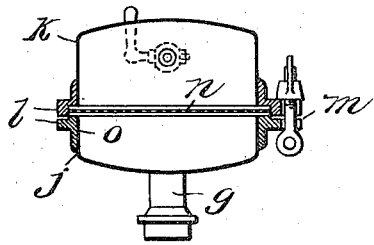
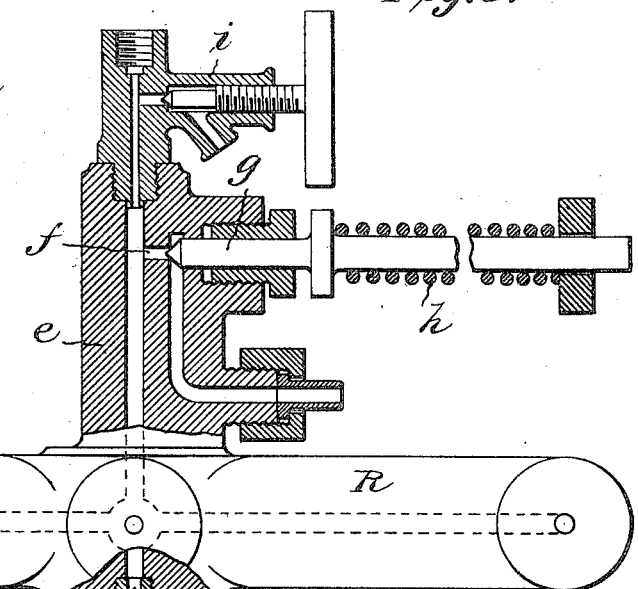
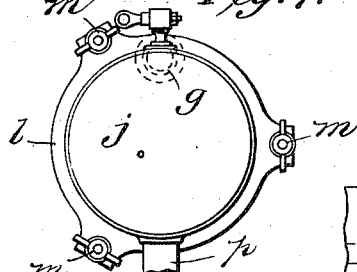
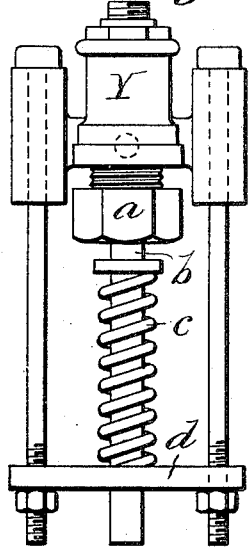

No. 756,953.

Patented April 12, 1904.

UNITED STATES PATENT OFFICE.

AUGUSTE GAULIN, OF PARIS, FRANCE.

SYSTEM FOR INTIMATELY MIXING MILK.

SPECIFICATION forming part of Letters Patent No. 756,953, dated April 12, 1904.

Application filed September 30, 1902. Serial No. 125,440. (No model.)

*To all whom it may concern:*

Be it known that I, AUGUSTE GAULIN, a citizen of the French Republic, residing in Paris, France, have invented certain new and useful Improvements in Systems for Intimately Mixing Milk; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention has for its object an improved apparatus for intimately mixing milk and other liquids more or less resembling it by means of the action produced by the passage of liquids more or less heterogeneous under considerable pressure through very small orifices.

Apparatuses have been constructed for intimately mixing fatty liquids, and these have been used for the treatment of milk. I have myself constructed such apparatuses; but experience has shown that none of these apparatuses has produced the required result in the treatment of milk. With some of them all the butter globules are not invariably pulverized, as is necessary, which causes the milk not to keep and, moreover, acquire a disagreeable taste. In other machines in passing through the pulverizing-orifice the butter globules are not all attacked, because it is only at the surface of the jet of milk which is forced into these orifices that there is really contact with the walls of the orifices, and the center particles of the jet flowing through the length of the said orifices resume their original shape on escape from the apparatus. If it is the butter portion, it again becomes globular.

My invention comprises an apparatus whereby the object in view is attained.

One of the important points of my invention, for which I seek Letters Patent, consists in causing the liquid to flow not only through invariable orifices, but also between adjustable surfaces so arranged as to be adaptable exactly one against the other and maintained pressed elastically and strongly one against the other. It results from the action of these surfaces upon the globules and other separate parts of the liquid that there is a complete breaking up and an intimate intermixture of these parts, whereas the passage of the liquid alone through invariable orifices, however fine they may be, only gives an incomplete incorporation. in the case of milk, for example, this much more energetic action of the surfaces pressed one against the other is explained by the fact that the solid or pasty globules (fat, casein, &c.) are obliged to force their passage between the said surfaces and cannot pass except by opening them. They are therefore necessarily flattened, crushed, and torn by these surfaces, which tend constantly to close upon them. By means of this novel system in the case of which we are speaking I am able to obtain treated milk exempt from any bad taste without recourse to any special precaution—such as the silvering of the tubes, &c.—whereas up to now milk treated always possesses a disagreeable flavor, which according to my experiments results from the incomplete mixing of the various elements. Further, I have discovered that the mixing is facilitated by the action of heat. For milk in particular a temperature of about 85° centigrade appears to be the most favorable.

The improved apparatus which I have devised includes certain well-known apparatuses, such as various pumps alternately actuated so as to regulate their effect and to force the milk under considerable pressure into a reservoir having orifices which serve for the mixing. My apparatus, however, possesses various important improvements. In the first place, the frame and the driving mechanism for the pumps are devised so as to avoid any irregularity in the motion of the pistons, so as to maintain the pressure as uniform as possible, which is essential according to my experiments for the perfection of the mixing. In the second place, I have provided the apparatus with a filter through which the pumps aspirate the liquid, so as to prevent the access of any solid body capable of damaging the mixing-surfaces. It is obviously necessary that these surfaces should be absolutely smooth one upon the other and free from any grooves. In the third place, with the object of facilitating the starting of the pumps, which has often given rise to much trouble hitherto, I have constructed in the upper part of the pressure-reservoir a cock which enables me to let off the air inclosed in the apparatus at the commencement of the operation.

By way of example I have illustrated in the accompanying drawings a constructional form of my improved apparatus.

Figure 1 illustrates a vertical section of the apparatus. Fig. 2 shows a plan thereof. Fig. 3 shows a vertical section through the mixing apparatus and the parts attached thereto. Fig. 4 illustrates a partial elevation corresponding to Fig. 3. Fig. 5 is a horizontal section of the parts S and W. Fig. 6 is a vertical section of the filter. Fig. 7 is a plan of the same. Fig. 8 is an elevation of the part W, on a large scale, showing also a portion of the rod $b$, likewise magnified, these two pieces having between them an exaggerated space to show clearly that they are independent of one another.

Upon a solid frame A are fixed three pump-barrels B, the slides C for guiding the piston-rods, two journals D, supporting the shaft E, which actuates the pump-pistons by means of the eccentrics F and the rods G. Two other journals, H, support a motor-shaft I, upon which are fixed a pulley J, a fly-wheel K, and a gear-wheel L, which engages with a large gear-wheel M, fixed upon the shaft E. From the proportion of the gearing L to M it results that the driving-shaft I must turn, as well as the fly-wheel K, at a greater speed than the shaft E of the pumps, and the regulating action of the fly-wheel is consequently much augmented. The liquid drawn up by the pumps passes by the tube N from a feed-reservoir placed at a higher level and traverses the filter O. From this point it reaches a reservoir P and the aspiration-valves Q. The pumps then force it into the reservoir R, then into a vessel S, which is placed upon this reservoir and which contains the mixing apparatus. This apparatus consists of a series of horizontal channels T, Fig. 3, formed in the part $x$ of the vessel S, and of two conical surfaces U V, formed one upon the lower face of the part X and the other upon a block or valve W of hard material—such, for instance, as agate—which is movable in a space formed for it in the lower part of the vessel. Upon this lower part of the vessel is fixed a box Y, provided with a discharge-tube Z for the exit of the mixed liquid. Through the box Y and the stuffing-box $a$, which it carries, there passes a rod $b$, which strikes against the valve W at one end, so as to cover the face of the part W, and it is pressed from below upward by means of a spring $c$, which rests against an adjustable frame $d$, fixed to the box Y. The surfaces U and V, exactly adjusted one to the other by grinding or otherwise, are thus pressed against one another by action of the spring $c$ with such force that the liquid must encounter a pressure of from two hundred and fifty kilograms to three hundred kilograms every square centimeter, or even more, in order to overcome the resistance which the valve offers to its passage. The arrangement of the channels T, leading normally to the surface of the valve W, is advantageous in this sense, that the liquid-jets are broken at the moment when they arrive at the entrance to the laminating surfaces. The arrows shown in Fig. 3 indicate the course of the liquid. Upon the collector R is placed, moreover, a tubular piece $e$, in which the orifice of a discharge-pipe $f$ is obstructed by means of a plunger G, pressed by a spring $h$, the tension of the spring being regulated in such a manner that it enables the plunger to open when the pressure of the liquid exceeds a certain limit above the normal pressure required for the mixing. Above the tube $e$ is placed a valve with pointed stopper $i$, which serves to give exit to the air inclosed in the apparatus when it is first set in action.

The filter (represented in Figs. 6 and 7) is specially constructed, so as to be easily taken to pieces and cleaned. It includes a box $j$ and a cover $k$, in beaten copper, the edges of which are fixed to the rings $l$ with a strengthened rim provided with hinged bolts $m$. A disk $n$, of wire-gauze, is supported by the rubber washers $o$ between the rings $l$ and serves to filter the liquid, which is delivered by the upper tube $p$ and escapes by the lower tube $q$. Upon the cover $k$ is placed an escape-cock for the air, which facilitates the filling of the filter; but although these constructional arrangements above described are advantageous for the regular and perfect operation of the device I reserve the right to modify them as circumstances may require as long as the device remains in its essential characteristics of my invention—that is to say, the employment of surfaces for mixing pressed elastically one against the other, whatsoever be their forms or dimensions and whatsoever their actuation with regard to the other parts. I may even suppress, in case it be required, any capillary portion with fixed channels.

Having now particularly described and ascertained the nature of my said invention and in what manner the same is to be performed, I declare that what I claim is—

1. In a machine of the class described, squeezing elements having coöperating concave and convex squeezing-surfaces and means to force liquid between the surfaces, substantially as described.

2. In a machine of the class described, coöperating elements having squeezing-surfaces, means to yieldingly hold the elements in contact and means to force the milk between the surfaces, substantially as described.

3. In a machine of the class described, a capillary-stream-forming element, coöperating squeezing elements having hard contacting squeezing-surfaces and means to force the milk through the stream-forming element and between the squeezing-surfaces, substantially as described.

4. In a machine of the class described, a capillary-stream-forming device and a squeezing device to squeeze the capillary streams so formed, substantially as described.

5. In a machine of the class described, successively-acting pumps, a reservoir connected to and charged by said pumps, a capillary-stream-forming device, squeezing devices having coöperating conical surfaces, means to yieldingly hold the squeezing devices together, an air-vent and a relief-valve on the reservoir, substantially as described.

6. In a machine of the class described, a strainer, a reservoir connected to the strainer, pumps connected to the reservoir to draw the liquid through the strainer, a second reservoir to which liquid is delivered by said pumps, an air-valve and a loaded relief-valve on the second reservoir, capillary tubes fed from said reservoir, a chamber at the end of said tubes and an agate piece fitting the end of said chamber, a rod acting on the end of said agate piece, a coil-spring to yieldingly hold the rod and agate piece against the end of the chamber, said rod provided with lateral grooves and a discharge-passage leading from around the ends of said grooves, substantially as set forth.

7. In a machine of the class described, an element having a reëntrant conical surface, a complementary conical element to fit the same and means to force milk between them, substantially as described.

8. In a machine of the class described, an element of hard metal having a reëntrant conical surface, a complementary conical element of agate to fit the same and means to force milk between the elements, substantially as described.

9. In a machine of the class described, an element having a reëntrant conical surface and capillary orifices formed at the apex of the conical surface, a complementary conical element, to fit the former surface, means to force milk through the orifices and between the conical surfaces, and means to hold the elements yieldingly in contact, substantially as described.

In testimony that I claim the foregoing as my invention I have signed my name in presence of two subscribing witnesses.

AUGUSTE GAULIN.

Witnesses:
FRILLEY JUSTIN,
MAIRE NICOLAS.